Patented June 11, 1940

2,204,324

UNITED STATES PATENT OFFICE 2,204,324

WOOD PUTTY

Louis C. Sohngen, Hamilton, Ohio, assignor to The Las-Stik Manufacturing Company, Hamilton, Ohio, a corporation of Ohio No Drawing. Application August 14, 1936, Serial No. 96,119

6 Claims. (Cl. 260—9)

This invention relates to plastic compositions and to a method of making the same. More particularly, the invention relates to air hardening cellulosic plastics of the consistency of putty and adapted to use in the filling of cracks and crevices of wood and metal, and in the manufacture of moulded articles.

It is a primary object of the present invention to provide a wood base putty which dries in the air without the application of heat and without shrinkage. It is further the object of the present invention to provide a wood putty, of plastic dough-like consistency, which is stable during storage, up to, during, and subsequent to, the time of merchandising.

The plastic composition of the present invention is adapted primarily to household use and, likewise to use in the production of moulded figurines and like articles.

One of the most important problems to which the present invention relates is the problem of providing, in a given composition, the quality of smoothability or finishability. In the repair of cracks or crevices in furniture, it is convenient usually to apply the plastic filler with a putty knife or spatula. If the plastic is not workable, then the knife tends to pick up the plastic, with the result that the surface of the fill is left rough and irregular. Moreover, the repairman in the home usually is relatively unskilled in the smoothing technique necessary to the production of a first class job. On the other hand, in the factories where plastic composition is used in the repair or reconstruction of worn wood parts, for example in the patching of wood lasts in shoe factories, the time element is important and, in this respect, it is essential that a given composition first be adapted to be applied and smoothed easily in one or two sweeps of the putty knife. Likewise, in the moulding of articles to minute detail configurations, it is essential that the plastic assume the mould configurations, and also separate from the mould to exhibit smooth finished surfaces.

Broadly speaking, the composition of the present invention comprises a cellulosic filler, vinyl resin, a solvent therefor and a smoothing agent adapted to provide a mass which is adhesive, plastic and finishable to smooth surface condition while in the plastic state. Otherwise expressed, it is the concept of the present invention to render a mass, which is adhesive in respect to wood and metal, finishable readily to smooth surface condition while the mass is in the plastic state, by first impregnating vinyl resin and solvent therefor into particles of cellulosic filler, and then distributing an oil in the mass to coat the particles of filler somewhat in the manner of a film thereover. In the preferred compositions of the present invention, the resinous ingredients are in the particles and the agents adapted to promote smoothability of the mass are over (or substantially around) the impregnated particles.

While the chemical characteristics of at least several of the ingredients of the present invention are relatively well known, the result provided by the combination is new and unsual in several important respects. Heretofore, it has been thought necessary to include in air hardening, cellulosic plastics, a secondary resin of the type of ester gum or the like, in conjunction with a plasticizing substance adapted to soften and render less brittle the primary resin ingredient. In accordance with the present invention, the cost of the plastic is appreciably lower by omission of the relatively expensive secondary resin. Moreover, the novelty resides in the determination that important benefits accrue by reason of the omission. Apparently, it has been considered in the past that a secondary resin is necessary to impart to a given composition the quality of adhesion, which is essential to the satisfactory performance of the plastic mass, particularly, when the mass is used as a filler in cracks and crevices in general repair of wood.

I have determined, however, that better adhesion and better smoothability and workability of a vinyl resin mass is provided by omission of the "adhesive resin" and by the inclusion in the composition of an oil which functions not as a substitute for the resin, but rather to promote smoothability of the mass during any period of time throughout its useful life. The invention, therefore, comprehends a plastic cellulosic mass which hardens in the air without shrinkage, and which is smoothable readily and may be handled equally as well after a period of six months to a year or more, as directly after the time of formulation.

The precise reason, which accounts for the unusual quality imparted to the mass by the oil, is not understood clearly. An oil of the type of castor oil is recognized as a plasticizer for resins of the nitrocellulose variety. On the other hand, blown castor oil is not compatible with vinyl resins and does not provide thereto a plasticizing action. In the broad sense, therefore, the oil ingredient of the present invention is not to be construed primarily as a plasticizing agent. On the other hand, I have determined that when a comparison of compositions in which oil of the type of blown castor oil is present in the absence of an adhesive resin, then the composition is characterized by a high degree of smoothability. The term "smoothability" in this respect is intended to designate the adaptability of a given composition to smooth finish, either by means of a putty knife or like instrument, or by moulding in a configurated mould. Likewise, the term "smoothing agent" is intended to designate a material of the type of blown castor oil, which provides, in a given plastic mass, the capacity to be worked conveniently and rapidly to a fine finish with, or by, a smooth surfaced tool or mould.

The vinyl resin of the present invention preferably comprises straight vinyl acetate, in contradistinction to various vinyl resins which result from the conjoint polymerization of vinyl chloride and vinyl acetate. The solvent for the resin of the present invention preferably comprises acetone or a similar ketonic solvent. The function of the solvent is directed primarily to the dissolution of the resin to put it into condition for kneading with the cellulosic filler.

The filler ingredient preferably comprises wood flour or finely divided filler, preferably of cellulosic origin. The fineness of the particles of the filler influences, though to a limited degree, the nature of the final mass. If the filler be too fine, then there is the tendency for the mass to set to an extremely hard consistency which might be undesirable where workability of the plastic, after it has hardened, is desired, though the use of fine filler augments smoothness of the surface of the plastic mass. On the other hand, if the particle size is too large, then there is the danger that the mass will tend to be somewhat crumbly. In practicing the invention, I prefer to use wood flour of approximately 120 to 150 mesh.

The "smoothing agent" of my preferred composition preferably comprises a semi drying oil, preferably of vegetable origin. Approximately 2% to approximately 6% by weight, of the smoothing ingredient is incorporated for best results. The invention is disclosed in relation to blown castor oil as the preferred smoothing agent, since this substance satisfies the requisites from the point of view of both cost and results. If the quantity of oil is too great, then the oily characteristic dominates the resin qualities of the material, and difficulty tends to be encountered in proper hardening. On the other hand, if the quantity of oil is substantially less than the lower value indicated, then full advantage of the function of the ingredient is not obtained.

To assist the skilled in the art in the practice of the present invention, the following formulae are disclosed as representative examples:

*Example 1*

| | Pounds (approximately) |
|---|---|
| Vinyl acetate | 32 |
| Acetone | 41 |
| Wood flour | 23 |
| Blown castor oil | 4 |

*Example 2*

| | |
|---|---|
| Vinyl acetate | 42 |
| Wood flour | 24 |
| Acetone | 32 |
| Blown castor oil | 2 |

The percentage of wood flour should not substantially exceed the range of approximately 23–25% by weight of the whole mass. Likewise, the quantity of vinyl acetate, preferably, is held in the range of about 30–45% by weight of the total mass.

If desired, the compositions made in accordance with the present invention may be pigmented in order to provide decorative effects.

The term "workability," as it is used in the present specification, is intended to designate the qualities which enable my improved composition to be applied to cracks, crevices, dents and marred surfaces, by means of a knife-like instrument, and which also enable the material to be finish moulded, either by hand or by casting, to a given configuration. If unusual turned inlay effects are desired, for example, half the diameter of a given turned article may comprise an ornamental wood such as walnut, and the other half of the turned diameter may comprise the plastic composition of the present invention united therewith through its own adhesion thereto. Turned articles of this nature exemplify the adhesion of my composition in respect to wood despite the fact that the adhesive resin, previously thought to have been necessary, is absent.

In preparing the product in accordance with the present invention the vinyl resin first is dissolved in suitable solvent, then the cellulosic filler is incorporated therein, as by kneading, in the manner well understood by those skilled in the art, until the filler is impregnated thoroughly with resin. Finally, the oil is worked into the plastic mass. Usually kneading of the resin into the filler requires about 25 to 30 minutes. If the smoothing agent is incorporated into the filler at the same time as the resin, then the distribution of resin in the mass is poor, the oil is not incorporated evenly over the surfaces of the filler particles, and the mass becomes crumbly. The process thus comprises, first, the impregnation of resin in the filler, then, the distribution of the smoothing oil somewhat as a film over the particles impregnated.

Kneading is continued until a uniform, homogeneous mass is established. The quantities of ingredients determine the final consistency which for all-around, or general repair purposes, preferably, is approximately the consistency of dough or putty. If a thinner consistency is desired, additional solvent mass is utilized.

Having described my invention, I claim:

1. A dough-like plastic composition which hardens in the air without shrinking, consisting of wood flour, polymerized vinyl acetate resin, solvent therefor, and a smoothing agent comprised of a semi drying oil distributed as a film over particles of flour.

2. The method of making a plastic wood putty which dries in the air without shrinking which method consists in kneading polymerized vinyl resin, solvent therefor, and wood flour to effect impregnation of the wood flour with the solvent and resin, then distributing a semi drying oil of vegetable origin over the impregnated particles of filler to render the mass smoothable, while plastic, to a fine finish.

3. A dough-like plastic composition which hardens in the air without shrinking, consisting of cellulosic filler impregnated with vinyl acetate resin, and solvent therefor, to a plastic consistency and rendered smoothable while plastic, to a fine finish, by a smoothing agent comprising blown castor oil, substantially surrounding the particles of filler impregnated with the resin.

4. A plastic composition consisting of about 23 to about 25 parts of wood flour, about 30 to about 45 parts of vinyl resin, about 2 to about 6 parts of blown castor oil, and sufficient solvent for the vinyl resin to provide a mass which is like putty in consistency, the particles of wood flour being impregnated with the vinyl resin and the castor oil being distributed as a film over the wood particles so impregnated.

5. In a process of making plastic putty composition, the step which consists in distributing blown castor oil over the surfaces of particles of cellulosic filler substantially impregnated with vinyl resin to render the impregnated filler smoothable when plastic.

6. A plastic composition consisting of particles of cellulosic filler impregnated with vinyl resin and solvent and enfilmed with blown castor oil sufficient in amount to render the mass smoothable when plastic.

LOUIS C. SOHNGEN.